Aug. 19, 1969    S. A. MENCACCI ET AL    3,462,003
CARRIER ATTACHMENT APPARATUS
Filed June 7, 1967    3 Sheets-Sheet 1
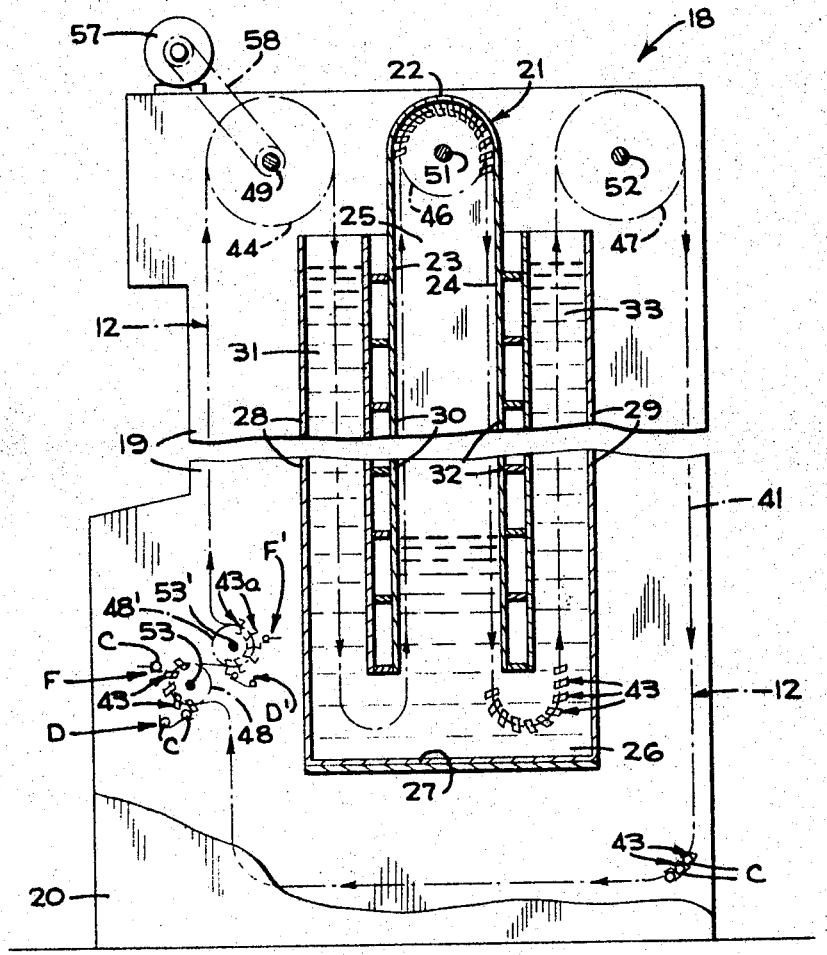
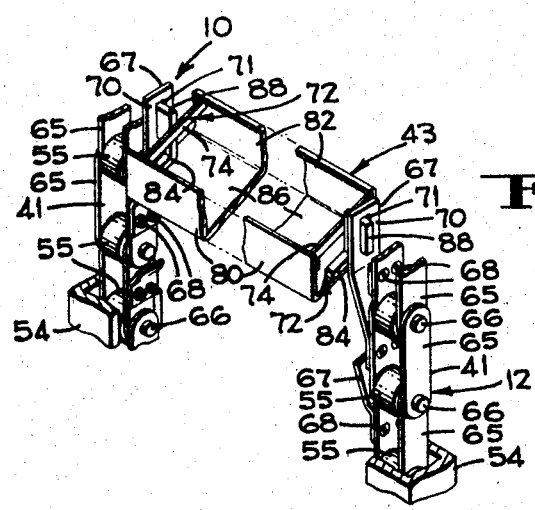
INVENTORS.
SAMUEL A. MENCACCI
JOHN G. HAGERBORG
BY
*Francis W. Anderson*
ATTORNEY Aug. 19, 1969  S. A. MENCACCI ET AL  3,462,003
CARRIER ATTACHMENT APPARATUS
Filed June 7, 1967  3 Sheets-Sheet 2
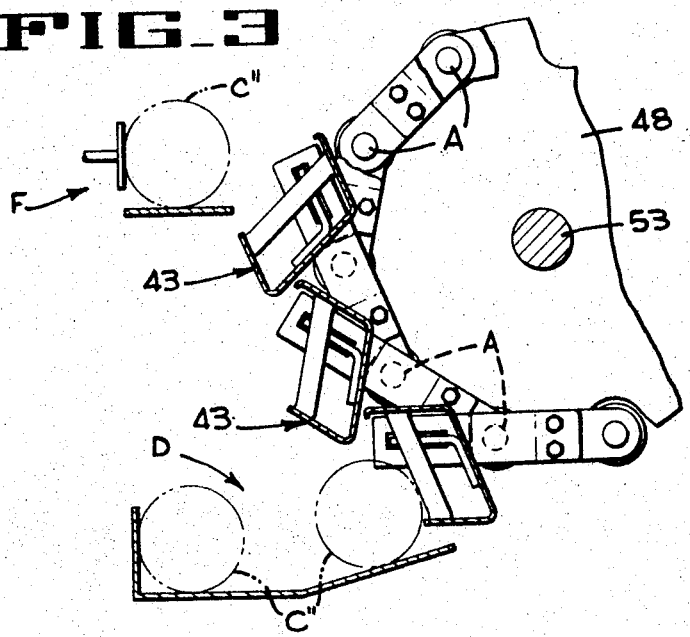
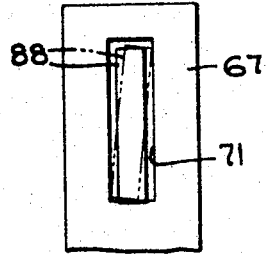
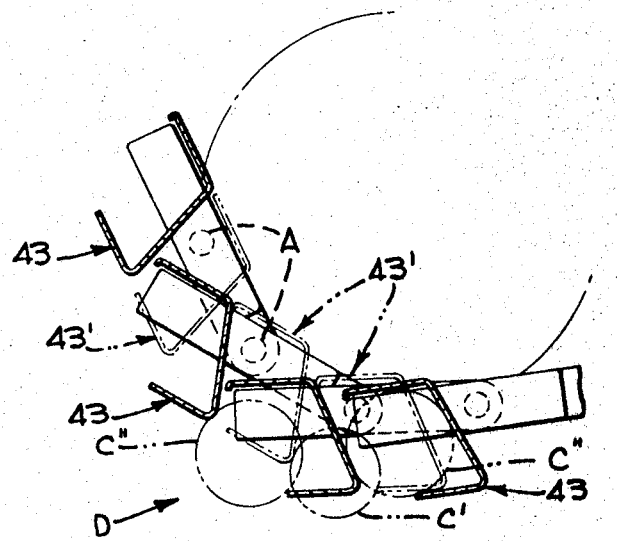
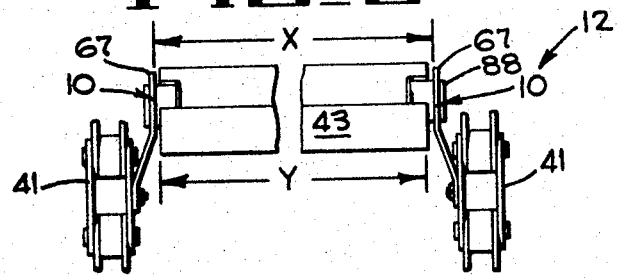
INVENTORS.
SAMUEL A. MENCACCI
JOHN G. HAGERBORG
BY Francis W. Anderson
ATTORNEY

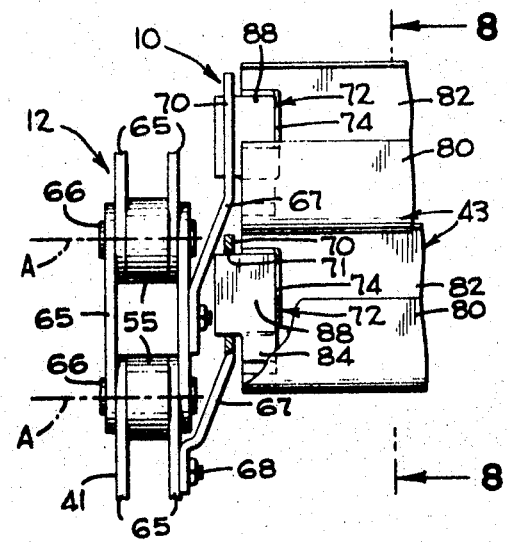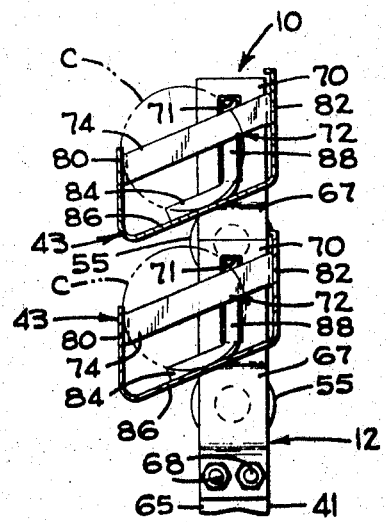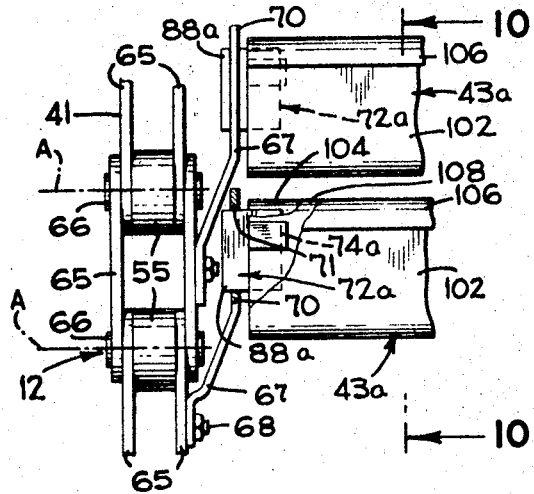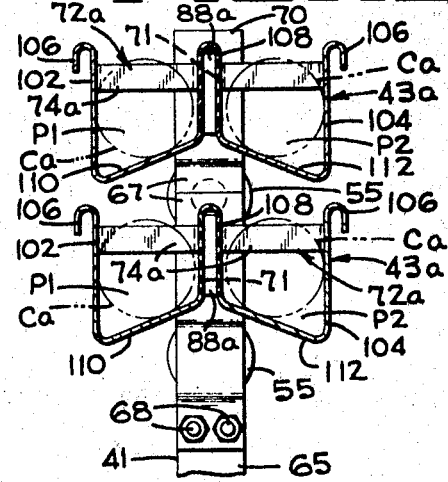

United States Patent Office

3,462,003
Patented Aug. 19, 1969

3,462,003
CARRIER ATTACHMENT APPARATUS
Samuel A. Mencacci, Antwerp, and John G. Hagerborg, St. Niklaas-Waas, Belgium, assignors to International Machinery Corporation S.A., St. Niklaas-Waas, Belgium, a Belgian corporation
Filed June 7, 1967, Ser. No. 644,280
Int. Cl. B65g 17/12, 17/16
U.S. Cl. 198—151                    13 Claims

ABSTRACT OF THE DISCLOSURE

Apparatus for attaching the ends of carriers of different sizes or shapes to chains of a hydrostatic cooker. Each attachment apparatus includes an arm bolted to the associated link and having its outer end slotted to provide a slidable connection for supporting the carrier outwardly beyond both pivot points of the supporting link. Brackets connected to the ends of the carrier have tongues loosely received in the slots of the associated arms to slidably support the carrier and permit flexing of the carrier relative to the chain.

CROSS-REFERENCE TO RELATED APPLICATIONS

The subject conveyor is designed for use in the type of cooker disclosed in our copending application Ser. No. 390,880 which was filed on Aug. 20, 1964 and which issued as Patent No. 3,347,351 on Oct. 17, 1967 and is assigned to the assignee of the present invention.

BACKGROUND OF THE INVENTION

This invention pertains to an improved apparatus for attaching carriers to the conveyor chains of a hydrostatic cooker so as to reduce stresses and strains on the chains, and more particularly relates to carrier attachment apparatus for slidably attaching each end of a carrier to the associated links of endless chains of a hydrostatic cooker in a manner which permits handling a wide size range of containers in each carrier and also permits the easy interchanging of carriers of different sizes or shapes to accommodate containers which are outside the size range of the original carriers.

The processing conveyor of this type of cooker includes a plurality of carriers each of which is usually above seven feet long and supports in excess of about 60 pounds of filled containers being processed. The carriers are evenly spaced along the processing conveyor, and the processing conveyor has a plurality of vertical runs that are about 60 feet tall. The conveyor is continuously driven along a circuitous path so that each carrier receives a row of containers at substantially atmospheric temperature and pressure when moving around the sharp curves at a feed station, advances the carriers and containers downwardly into a pre-heating housing which gradually heats the containers and carriers to about 238° F. to 263° F., then advances the carriers and container upwardly and thereafter downwardly through a steam chamber maintained at about 250° F. to 275° F., then moves the containers and carriers upwardly through a housing filled with a column of water which gradually cools the containers and carriers to about 210° F., then moves the containers and carriers past cooling sprays of water at about 60° F. before again returning the carriers to the feed and discharge stations where the rows of processed containers are discharged in response to the carriers moving around a sharp curve and where new rows of unprocessed containers are fed into each carrier at which time the above cycle of operation is again repeated.

It has been determined that hydrostatic cooker conveyors frequently break at welded or unduly strained portions thereof thereby requiring objectionable shut-down of the cooker for repairs. Although it is not completely understood why the breakage occurs it is noted that the breakage occurs primarily at the welded joint and secondarily at the highly stressed points of the conveyor. It is believed that this breakage is caused by the repeated expansion and contraction of the links and carriers due to the substantial changes of temperature acting thereon during each cycle of operation. This repeated expansion and contraction first tends to open cracks at welded joints and also at highly stressed areas of the chain links and carrier end portions, and thereafter tends to gradually enlarge the cracks causing the subsequent breakage.

Because the cookers are both large and quite expensive it is desirable to mount carriers bars on the conveyors in such a way that they will handle a wide size range of containers. It is also desirable to provide carriers of different sizes and shapes which may be easily substituted for the carriers on the chains so as to permit a canner to substitute carriers of different sizes and shapes so as to accommodate all sizes of containers which he desires to process.

SUMMARY OF THE INVENTION

The carrier attachment apparatus of the present invention is designed to reduce strain on the conveyor chains by eliminating the welded connections thereto and by supporting the carriers in such a manner that they may freely expand and flex a limited amount relative to the chains when subjected to twisting or binding forces caused by temperature changes or the like.

The specific manner of mounting the carriers on the chain links, i.e., so that the carriers are disposed beyond both pivot points of their supporting links measured in a direction parallel to the direction of movement of the conveyor, enables the carriers to accommodate a wider container size range than could be accommodated if the same size carriers were mounted between the pivot points of their supporting links. When the carriers are mounted outwardly beyond both pivot points as above described, as contrasted to being mounted between the pivot points, the carriers open wider when the conveyor moves around the sharp curve at the feed and discharge station thus permitting larger containers to be handled by the carriers.

In the event an entirely different size range of containers is desired to be processed, the slidable tongue and slot connection permits the carriers on the conveyor to be removed and a new set of carriers of the desired size or shape to be substituted therefore merely by separating the two chains a short distance and manually sliding one set of carriers off the chain and substituting for these carriers another set of carriers of the desired size and shape.

BRIEF DESCRIPTION OF DRAWINGS

FIGURE 1 is a diagrammatic central vertical section illustrating a hydrostatic cooker having a processing conveyor of the type which utilizes the carrier attachment apparatus of the present invention.

FIGURE 2 is a perspective of one of the carriers showing the slidable carrier attachment apparatus connecting each end of the carrier to its associated chain link, said carrier being adapted to handle one row of relatively large containers.

FIGURE 3 is an enlarged vertical section taken through the feed and discharge stations illustrating the manner of feeding containers into and discharging containers from the preferred single pocketed carriers.

FIGURE 4 is a diagrammatic view similar to FIGURE 3 illustrating in full lines the single pocketed carriers mounted outwardly beyond both pivot points of the supporting links showing the maximum size container that can be accommodated by the carrier being discharged from the carrier, said view also illustrating in phantom line for comparison the same size carriers mounted midway between the pivot points of the links and further showing the maximum size containers that can be discharged from the so mounted carriers.

FIGURE 5 is an enlarged view showing the tongue and slot carrier mounting illustrating the tongue in solid lines in its normal position and in phantom lines in a twisted position.

FIGURE 6 is a side elevation of a carrier and the carrier mountings illustrating the carrier length in comparison to the space between the carrier mountings which permit free expansion or contraction of the carrier.

FIGURE 7 is an enlarged elevation showing the carrier attachment apparatus or carrier mounting connecting one end of the carrier of FIGURE 2 to one of the chains, certain parts being cut away.

FIGURE 8 is a section taken along lines 8—8 of FIGURE 7.

FIGURE 9 is an elevation taken at the same scale as FIGURE 7 illustrating one end of a different type of carrier with portions broken away and supported by the attachment apparatus to one of the chains, said carrier being adapted to handle two rows of relatively small containers.

FIGURE 10 is a section taken along lines 10—10 of FIGURE 9.

DESCRIPTION OF PREFERRED EMBODIMENT

The improved carrier attachment apparatus or carrier mountings 10 (FIGS. 2–8) of the present invention are adapted to attach many different sizes and shapes of carriers to the processing conveyor 12 of a hydrostatic cooker 18. The hydrostatic cooker 18 (FIG. 1) is of standard well known design and may be of the type disclosed in U.S. Patent No. 3,031,065 which issued to John F. French on Apr. 24, 1962. The hydrostatic cooker 18 comprises, in general, a pair of spaced vertically extending side walls 19 and 20 suitably supported in an upright position. A housing 21, which extends between walls 19 and 20, has a rounded upper end 22 and two depending walls 23 and 24 which cooperate with walls 19 and 20 to define a cooking chamber 25 which is filled by means of conduits (not shown) with steam at a predetermined cooking pressure and temperature for example, at 275° F. and 20 p.s.i. gauge. The lower end of the housing 21 opens into a water filled trough 26 which is formed by the side walls 19 and 20, a transverse horizontal plate 27, and the lower end portions of two transverse vertical walls 28 and 29. The wall 28 cooperates with another transverse vertical wall 30 to define an inlet hydrostatic water leg 31, and the wall 29 cooperates with a transverse vertical wall 32 to provide an outlet hydrostatic water leg 33. The hydrostatic legs 31 and 33 communicate with trough 26 and are filled with water so as to create sufficient pressure to resist the steam pressure in the cooking chamber 25. The inlet hydrostatic water leg 31 is thermostatically controlled to provide a gradually increasing water temperature from approximately 210° F. at its upper end to approximately 275° F. at its lower end. The outlet water leg 33 is also thermostatically controlled to provide a gradual decrease of water temperature from approximately 275° F. at its lower end to any suitable temperature below the boiling point of water at atmospheric pressure, depending upon the type of containers being handled, at the upper end thereof. Steam is added to the water in the hydrostatic inlet leg 31 to provide the desired temperature therein, and cold water is directed into the outlet or cooling leg 33 to provide the desired cooling temperature therein.

Rows of containers to be processed are carried through the cooker by the endless conveyor 12. The conveyor 12 comprises a pair of endless chains 41 (FIG. 2) having a plurality of elongated spaced carriers 43 mounted therebetween. The chains 41 are trained around transversely aligned pairs of sprockets 44, 46, 47, 48 and 48' (only one sprocket of each pair being shown in FIGURE 1) which are keyed to shafts 49, 51, 52, 53 and 53', respectively, that are suitably journalled on the side walls 19 and 20. The chains 41 are guided along tortous paths by channel tracks 54 (FIG. 2) which tracks are secured to the frame of the cooker and are arranged to receive rollers 55 carried by the chains. A variable speed motor 57 (FIG. 1) is connected to the shaft 49 by a chain drive 58 which drives the conveyor 12 continuously in the direction of the arrows indicated on the pitch line, shown in FIGURE 1, of the path of travel of the conveyor. If desired, the shafts 51 and 52 may also be driven by an extension of chain drive 58.

Each chain 41 (FIGS. 2, 7 and 8) include a plurality of links 65 which are pivotally connected by pivot pins 66 having the rollers 55 journalled thereon about pivot axes A (FIGS. 4 and 7). A carrier supporting arm or second mounting portion 67 of the carrier attachment apparatus 10 is connected to each link 65 by bolts 68 (FIGS. 7 and 8), and the arms have carrier connecting end portions 70 which lie in a common vertical plane parallel to and spaced transversely inwardly of the plane in which the associated chain 41 lies. The end portion 70 of each arm extends outwardly in the direction of movement of the conveyor beyond both pivot points of the supporting link and has an elongated aperture or slot 71 formed therein.

In order to connect the adjacent end of a carrier to the arm 67, each attachment apparatus or carrier mounting 10 includes a first mounting portion in the form of a container stop and end supporting bracket 72. The bracket 72 includes a container stop bar 74 which prevents the containers C from moving longitudinally of the carrier out the end thereof. The stop bar 74 has tabs extending transversely thereof which are rigidly secured to parallel side walls 80 and 82, respectively, of the carrier 43 as by welding. An angle member 84 is rigidly secured to the base 86 of the carrier 43 and to the stop bar 74 and has a tongue 88 formed integrally therewith and projecting longitudinally of the carrier 41 through the slot 71 a short distance. As indicated in FIGURE 7, the tongue 88 projects through the slot 71 a distance equal to or slightly in excess of the distance between the end of the carrier and the adjacent face of the end portions 70 of the arm 67 so as to eliminate danger of the two tongues on each carrier from sliding out of either slot during normal operation of the cooker.

The tongue 88 is slidably received and loosely fitted in the slot 71 thus permitting the tongue to freely slide longitudinally within the associated slot to accommodate longitudinal expansion and/or contraction of the carrier 41 without subjecting the chains 41 to any measurable stresses due to expansion of the carrier. As shown in FIGURE 6, the gap between adjacent surfaces of the carrier supporting arms 67 is indicated by the distance X while the length of each carrier is somewhat smaller than the gap as indicated by distance Y thus permitting ample room for expansion. In addition to the above and as illustrated in FIGURE 5, the loose fit permits one end of the carrier 43 to twist slightly relative to the other end without applying any adverse forces to the chains 41.

As indicated in FIGURES 3, 4, 6, 7 and 8 the carrier attachment apparatus 10 supports the entire carrier outwardly in the direction of movement of the carriers beyond both pivot points A of the supporting links. It has been found that mounting the carriers in this manner causes the carriers to open fully when they are deflected at least 30° relative to the next following carrier in response to being moved around a sharp curve at the feed station F and discharge station D (FIGS. 1, 3 and 4) and, accordingly, can accommodate larger containers C than could be accommodated by carriers 43' (FIG. 4) of the same size and shape if the carriers were mounted between the pivot points of their supporting links. As clearly illustrated in FIGURE 4, container C' is the maximum size container that can be discharged from carriers 43' and that these containers are much smaller than the maximum size container C" (FIG. 4) that can be accommodate by the carriers 43. It will be understood, of course, that smaller containers such as containers C (FIG. 8) can also be accommodated by the carriers 43.

In FIGURES 9 and 10 a second embodiment of the invention is illustrated. The second embodiment of the invention is quite similar to the first embodiment and, therefore, only those parts of the second embodiment which differ from the first embodiment will be described in detail. Parts of the second embodiment that perform identical functions to parts of the first embodiment will be assigned the same numerals followed by the letter *a*.

In the second embodiment of the invention a double pocketed, W-shaped carrier 43*a* is employed to simultaneously handle two rows of containers Ca in pockets P1 and P2 that are smaller than the container C handled by the carriers 43 of the first embodiment. The W-shaped carriers 43*a* each comprises side walls 102 and 104 having U-shaped strengthening lips 106 on their free ends, a U-shaped central wall 108 and base walls 110 and 112 connecting the central wall 108 to the side walls 102 and 104, respectively. A container stop and end supporting bracket 72*a* includes two stop bars 74*a*, one bar being rigidly secured as by welding between the side wall 102 and the central wall 108, and the other stop bar being rigidly secured between the side wall 104 and central wall 108. Tongues 88*a*, in the form of short bars, are rigidly secured within the U-shaped space in the central wall 108 and project laterally outwardly from the adjacent end edges of the carrier 43*a* through the slots 71 in the associated arms 67. The arms 67, as in the first embodiment of the invention, position the entire carriers 43*a* outwardly in the direction of movement of the conveyor 12 beyond both pivot points of the supprting links 65. In this way, both pockets of the carrier are fully opened when they are deflected 30° from the next following carrier 43*a* as they move past the associated feed and discharge stations. The feed and discharge stations for pockets P1 are stations F and D shown in FIGURE 1, and the feed and discharge stations for pockets P2 are stations F' and D' which are disposed around the sprockets 48' which serve to sharply bend the carriers at least 30° relative to the next adjacent carrier in a direction opposite from that required when feeding into pocket P1. Although carriers 43 and 43*a* are shown mounted on the conveyor 12 (FIG. 1) at the same time, it will be understood that the preferred arrangement is to fit the conveyor with only one type of carrier at a time.

In operation, the motor 57 (FIG. 1) continuously drives the conveyor 12 through the hydrostatic cooker 18. If it is resired to sterilize large container C, C" the single pocket C-shaped carriers 43 (FIGS. 3, 4, 7 and 8) are mounted on the conveyor 12. Rows of containers are fed into the containers 43 at feed station F at which time the carriers are completely opened as illustrated in FIGURE 3 due to their being mounted beyond both pivot points of their supporting links 65. These carriers and containers are then moved through the inlet hydrostatic leg 31 and through the sterilizing chamber 25 during which time the temperature gradually increases from atmospheric temperature to about 250° F.–275° F. depending upon the product being processed. The sterilized containers are then moved out of the sterilizing chamber 25 through the cooling leg 33 and are subsequently discharged at discharge station D at atmospheric temperature. In view of the above it will be apparent that the carriers expand and contract considerably, and may also tend to twist, due to internal stresses resulting from the substantial temperature changes. However, the expansion and contraction forces, as well as the twisting forces, are not transmitted to either of the chains 41 because the carrier attachment or mounting apparatus of the present invention permits the connecting tongues 88 to slide longitudinally in the apertures or slots 71, and also permits a limited amount of twisting of the tongues within the slots. Thus, the carrier attachment apparatus of the present invention reduces strains which would otherwise be applied to the conveyor chains, and accordingly, increases the life of the chains and reduces maintenance costs.

In the event the canner desires to handle smaller containers than can be handled by the larger carriers 43 of the first embodiment of the invention, the canner may merely remove certain sections of the chain guide tracks 54 (FIG. 2) so that the chains 41 can be separated a distance sufficient to slide one of the tongues 88 out of its associated slot 71 and then pull the other tongue 88 out of its associated slot thereby removing the carriers 43 from both chains 41. The carrier 43*a* may then be substituted for the carrier 43 by merely inserting the tongues 88*a* into the associated slots 71 of arms 67. All of the carriers 43 may be replaced by carriers 43*a* in this manner and, thereafter, the removed track sections 54 is replaced. After the new set of carriers have been substituted for the old carriers, and the track sections have been returned to their original position, the machine is ready for operation with a new set of carriers. In this regard, it will be noted that the pockets P1 receive and discharge containers when passing stations F and D, and that pockets P2 receive and discharge containers when passing stations F' and D'.

It will further be understood that if the cooker is designed to handle only single pocketed carriers such as the carriers 43 disclosed in FIGURES 2–4, that the sprockets 48' may be eliminated.

From the foregoing description it is apparent that the carrier attachment apparatus of the present invention mounts carriers to the chains of the processing conveyor of a hydrostatic cooker in a manner which permits a limited amount of movement of the carriers relative to the supporting chains thereby permitting longitudinal expansion and lateral twisting or flexing of the carriers relative to the chains thus minimizing the wear on the pins and links of the chains. The carriers are also supported outwardly in the direction of movement of the chains beyond both pivot points of each of the supporting links to which a carrier is attached thereby assuring that the carriers will open widely enough at the feed and the discharge station to permit reliable acceptance and discharge of the largest diameter container that will fit within the physical dimensions of the carrier. The carrier attachment apparatus will also permit carriers of different sizes and/or shapes to be interchanged on the same pair of chains thereby adapting the hydrostatic cooker to handle a much wider range of container sizes than could be handled by any one size of carrier.

We claim:

1. In a conveyor for a hydrostatic cooker of the type wherein the conveyor includes a plurality of carriers, two spaced endless chains guided along a circuitous path through the cooker by tracks and cooperating sprockets, each chain being formed by a plurality of links pivotally connected together by pins defining pivot axes, and carrier mountings connecting said carriers to said links; the improvement wherein said carrier mountings include first mounting portions connected to the carriers and second mounting portions connected to the links, one of said mounting portions having tongues projecting therefrom, the other of said mounting portions having apertures formed therein for slidably receiving said tongues, said carriers being shorter than the gap between associated second mounting portions for accommodating longitudinal expansion and contraction of said carriers relative to said conveyor chain.

2. An apparatus according to claim 1 wherein said tongues are connected to said first mounting portions and project outwardly of said carriers, and wherein the apertures are formed in the second mounting portions.

3. An apparatus according to claim 2 wherein each of said second mounting portions has one aperture formed therein and wherein said aperture is a slot.

4. An apparatus according to claim 3 wherein said second mounting portions are arms and wherein said slotted end of each of said arms and the entire carrier supported thereby are disposed outwardly in the direction of movement of the carriers beyond both pivot axes of the particular links which support the carriers.

5. An apparatus according to claim 4 wherein said arms are bolted onto the associated links and wherein the slots loosely receive the associated tongues to allow one end of the carrier to twist a limited amount relative to the other end of the carrier and for accommodating longitudinal movement of the carrier relative to the chains thereby minimizing the application of carrier induced stresses to the chains.

6. An apparatus according to claim 5 wherein said tongues project through their associated slots a distance sufficient to prevent disengagement of the tongues from the slots when the chains are guided by their tracks and sprockets.

7. An apparatus according to claim 1 wherein said tongues project through their associated apertures a distance sufficient to prevent disengagement of the tongues from the apertures when the chains are guided by their tracks and sprockets.

8. An apparatus according to claim 7 wherein the conveyor tracks have removable portions and wherein said tongues may be removed from said associated apertures and said carriers removed from the conveyor and replaced by a different carrier having similar first mounting portions engageable with said second mounting portions upon removal of the removable portions of the tracks and separating the two chains from each other a distance greater than the length of one of said tongues plus the length of said gap.

9. An apparatus according to claim 8 wherein the conveyor tracks have removable portions and wherein said tongues may be removed from said associated slots and said carier removed from the conveyor and replaced by a carrier or different configuration having similar tongues projecting therefrom upon removal of the removable portions of the tracks and upon separating the two chains from each other a distance greater than the length of one of said tongues plus the length of said gap.

10. An apparatus according to claim 9 wherein said arms are bolted onto said associated links and wherein said slots loosely receive said associated tongues to allow one end of the carrier to twist a limited amount relative to the other end and for accommodating the longitudinal movement of the carrier relative to the chains thereby minimizing the application of carrier induced stresses to the chains.

11. An apparatus according to claim 1 wherein said tongues and said apertures are rectangular in shape.

12. In a conveyor for a hydrostatic cooker of the type wherein the conveyor is movable in a predetermined direction and includes a plurality of carriers, two spaced endless chains guided along a circuitous path through the cooker by tracks and cooperating sprockets, each chain being formed by a plurality of links pivotally connected together by pins defining pivot axes, and carrier mountings connecting said carriers to said links; the improvement wherein said carrier mountings include arms connected to the associated links, each arm having an end portion projecting outwardly in the direction of movement of the conveyor beyond both pivot points of said supporting links, and means for connecting the ends of each carrier to associated link end portions for supporting the entire carrier outwardly measured in the direction of movement of the conveyor beyond both pivot points of the associated supporting links, said connecting means including tongues connected to and projecting outwardly from the carrier, and the end portions of the associated arms being sloted for slidably receiving said tongues.

13. In a conveyor for a hydrostatic cooker of the type wherein the conveyor includes a plurality of carriers, two spaced endless chains guided along a circuitous path through the cooker by tracks and cooperating sprockets, each chain being formed by a plurality of links pivotally connected together by pins defining pivot axes, and a carrier mounting connecting each end of each carrier to a link of one of said chains, the improvement wherein each carrier mounting includes a first mounting portion connected to the carrier and a second mounting portion connected to the associated link, one of said mounting portions having a tongue projecting therefrom, the other of said mounting portions having an aperture formed therein for slidably receiving said tongue.

References Cited

UNITED STATES PATENTS

| 737,195 | 8/1903 | Barry | 198—131 X |
| 2,397,698 | 4/1946 | Sigler | 198—131 |

EDWARD A. SROKA, Primary Examiner

U.S. Cl. X.R.

198—152